(12) United States Patent
Davis

(10) Patent No.: US 6,715,591 B2
(45) Date of Patent: Apr. 6, 2004

(54) SPACECRAFT ISOLATOR LAUNCH RESTRAINT

(75) Inventor: Toren S. Davis, Peoria, AZ (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 10/041,692

(22) Filed: Jan. 8, 2002

(65) Prior Publication Data

US 2003/0127784 A1 Jul. 10, 2003

(51) Int. Cl.[7] .................................................. F16F 9/30
(52) U.S. Cl. ..................... 188/268; 188/267; 188/266.2
(58) Field of Search ............................ 188/267, 267.2, 188/266.1, 266.2, 268; 267/140.14, 140.15

(56) References Cited

U.S. PATENT DOCUMENTS

| | | | |
|---|---|---|---|
| 4,548,838 A | | 10/1985 | Sunohara |
| 4,745,876 A | * | 5/1988 | Whiting ...................... 116/268 |
| 5,160,233 A | * | 11/1992 | McKinnis Darin N. ..... 411/433 |
| 5,305,981 A | * | 4/1994 | Cunningham et al. ...... 248/550 |
| 5,868,161 A | * | 2/1999 | Asbrand et al. ............. 137/498 |
| 5,967,268 A | * | 10/1999 | de Molina et al. .......... 188/277 |
| 6,003,849 A | * | 12/1999 | Davis et al. ........... 267/140.14 |
| 6,354,576 B1 | * | 3/2002 | Jacobs et al. .......... 267/140.14 |
| 6,508,437 B1 | | 1/2003 | Davis et al. |

FOREIGN PATENT DOCUMENTS

DE 19806501 C 8/1999

OTHER PUBLICATIONS

Tini Aerospace, Inc. Frangibolt Actuator—http://www.tini-aerospace.com/produts.html San Leandro, California.

* cited by examiner

Primary Examiner—Christopher P. Schwartz
Assistant Examiner—Devon Kramer

(57) ABSTRACT

A spacecraft isolator including shape memory alloy components that are electronically heated to unlock the isolator. The isolator can be manually unlocked with an adjustment bolt.

15 Claims, 2 Drawing Sheets

SPACECRAFT ISOLATOR LAUNCH RESTRAINT

BACKGROUND

Components on spacecraft frequently are mounted on flexible isolator devices (damper struts), like the one in U.S. Pat. No. 6,003,849, configured in a hexapod arrangement in U.S. Pat. No. 5,305,981, or some other strut/truss support system. However, when a spacecraft is launched the components are sometimes restrained on a launch retention mechanism for many reasons, including decreasing deflections of the isolation systems beyond design limits. The launch retention mechanism can be an integral part of the isolation struts or a separate supporting structure. Current launch restraints pull the isolator into a fixed latch position away from the isolator's neutral in-orbit position, known as isolator bias. The bias can present difficulties when precise alignment between the isolator mounted payload and the base structure, to which the isolator is attached, is important for pre-launch preparations. Alignment adjustments between the payload and spacecraft are made on earth, where gravity sags the isolator away from the zero-gravity orientation that it will assume in outer space. This makes accurate payload positioning prior to launch problematic.

SUMMARY

A device is included in the isolator strut for locking the isolator in either a zero bias position (the damper is not loaded at either of its two extreme possible positions) or known/predetermined bias position and electronically overcome to unlock the strut. Another mechanical element is included to temporarily unlock the isolator without disturbing the other devices.

Objects, benefits and features of the invention will apparent to one of ordinary skill in the art from the drawing and following description.

DESCRIPTION

Figure 1:
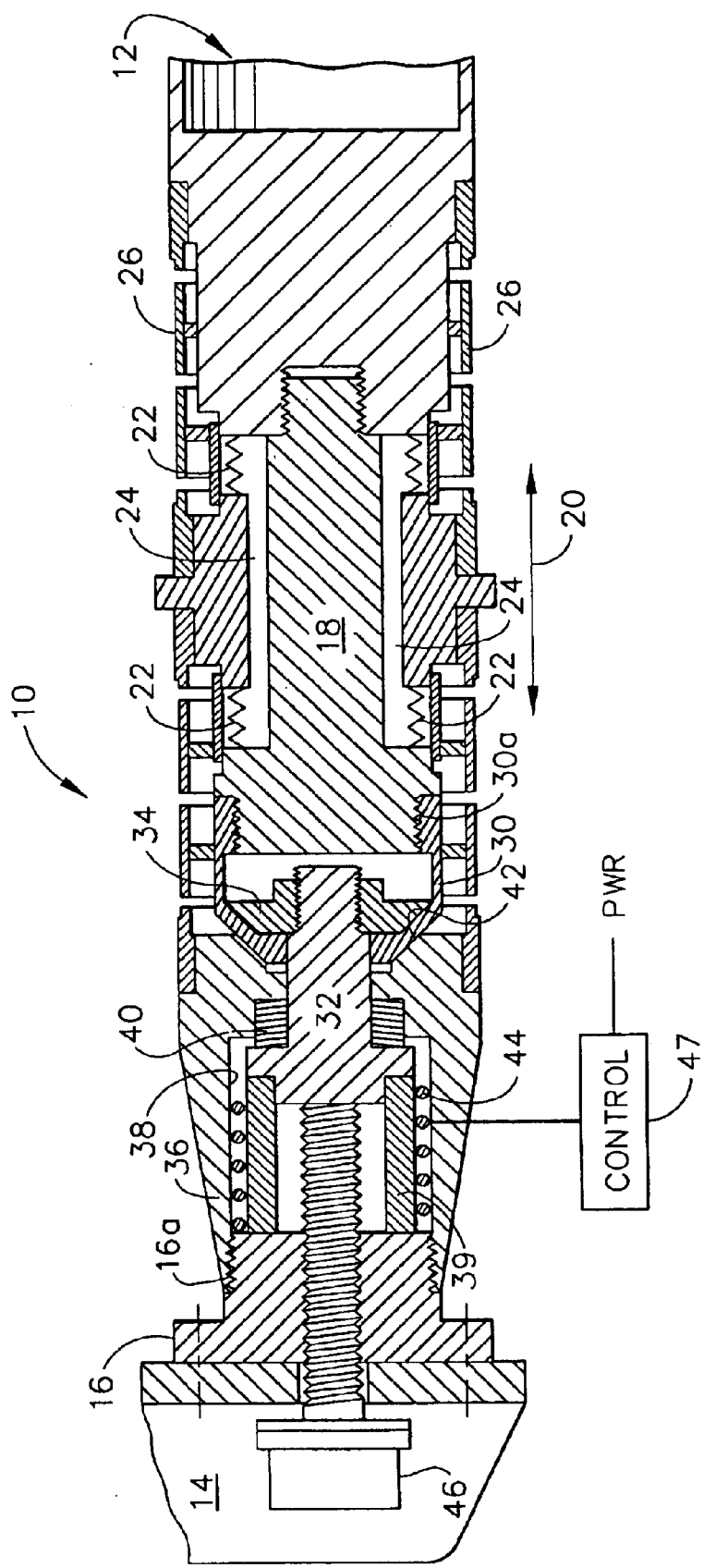
FIG. 1 is a cross-section of an isolator with an integral device which according the invention locks the isolator in a biased position.

The isolator strut 10 in shown in FIG. 1 connects a payload, at one end, and to a base structure surface with a bracket 14. A strut base plate 16 is attached to the bracket 14. The tubular-shaped isolator strut 10 contains a piston 18 that moves back and forth (arrow 20) displacing fluid between bellows 22 through internal passages 24, providing fluid damping. In addition, a coil spring 26 is installed around the outside of the isolator strut 10, also connecting with the piston (damper) the payload and base structure surface.

A tapered cap 30 is attached to one end of the piston 18 by threads 30a. A threaded bolt 32 extends into the cap 30, attaching to a tapered nut 34 that fits into the cap 30. The plate 16 is threaded at 16a to screw on the top section 36. The cap of bolt 32 is located in a chamber 38, accessible when the plate 16 is removed. Belleville washers 40 tension the cap 30 firmly against the section 36 at point 42 by pulling the bolt 32 to the left displacing the piston 18 to the left (towards the base structure surface) and locking the payload on the bracket 14.

Also located in the chamber 38, a tubular-shaped unlocking component 39, constructed of "shape-memory" alloy such as Nitinol, is situated between the bolt 32 and screw-on end fitting 36 and surrounded by a heating coil 44. The special characteristic of the alloy is that once heated, it holds an expanded state. Power is applied to the heating coil through a control 46, causing the unlocking component 39 to expand, compressing the bolt 32 against the belleville washers, which frees the nut 34 from the cap 30, freeing the piston 18, thereby returned to its normal operating or zero-bias position, towards the payload, where it is free to move normally.

A manual unlocking bolt 46, threaded through the plate 16 and the end of the bracket 14, can push on the bolt 32, making it possible to manually move the bolt 32 to the right (compressing the belleville washers 40) to release the piston 18, which unlocks the strut. The use of the bolt 46 makes it possible adjust the payload relative to the bracket 14 and the surface to which it is mounted prior to launch with the isolator active or unlocked (as it would during flight operations after launch) without activating the unlocking component 39. Once those adjustments are made the bolt 46 can be removed, relocking the payload.

Figure 2:
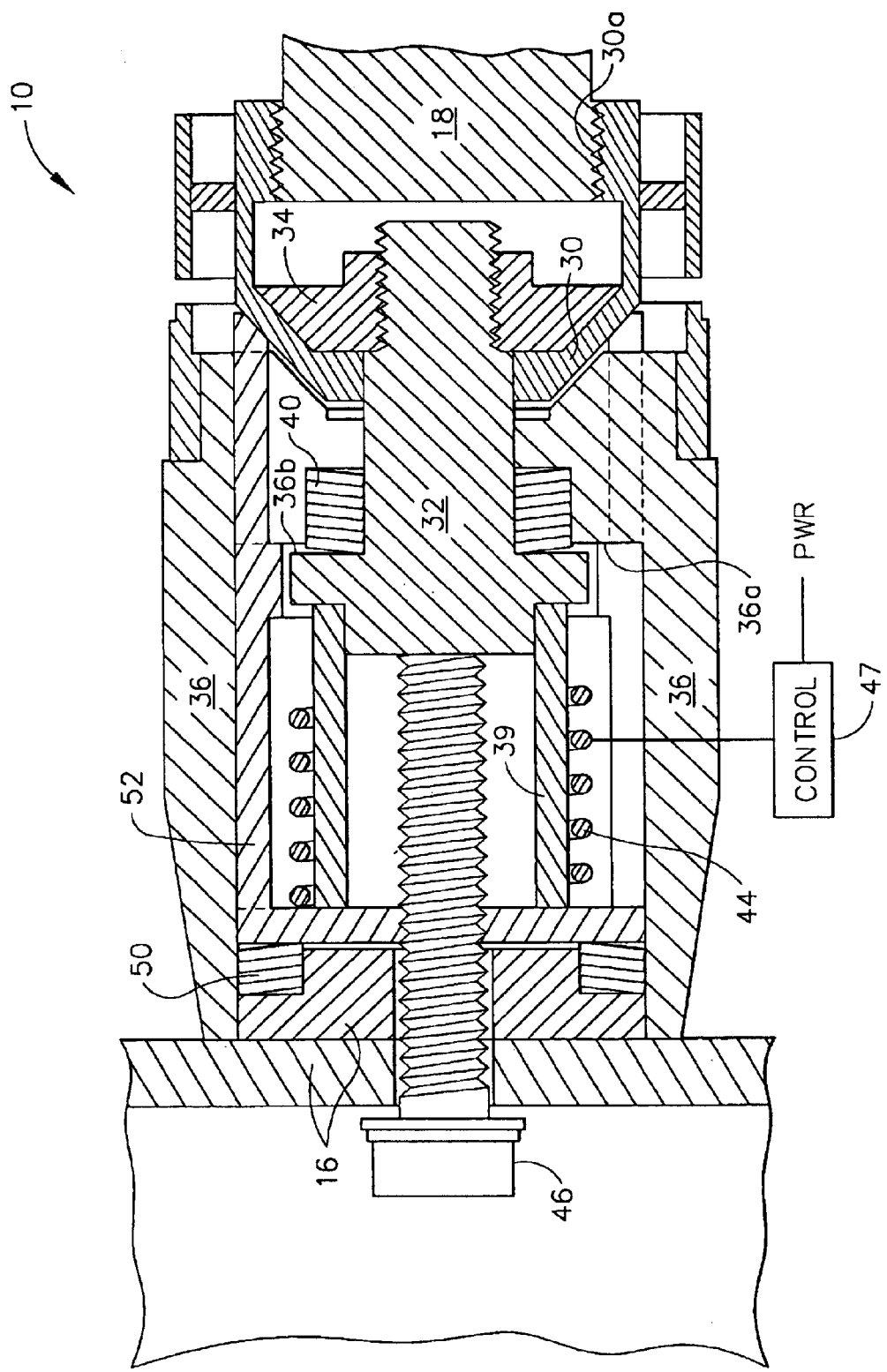
FIG. 2 is a cross-section showing a different version of the isolator, where the isolator is locked in a zero-bias (neutral) position.

In FIG. 2, all the previous components are the same except additional components are added so that when the strut 10 is locked, piston 18 is held in a normal or zero-bias configuration. To accomplish that, additional belleville washers 50 are placed between the plate 16 and a tubular insert 52 that passes through section 36. The insert 52 contains longitudinal (in the direction of the bolt 46) slots (not visible) for longitudinal surfaces section 36 that extend radially inward, through insert 52, provide stop points 36a, 36b explained below. Insert 52 presses against section 36 at point 36a, controlling the location of contact between insert 52 and cap 30, so that piston 18 is in its free or unbiased position. Belleville washers 40 press bolt 32 and nut 34 against cap 30 and insert 52, providing a substantially more rigid connection. The clamping force exerted by belleville springs 50 must be substantially larger than the clamping force exerted by belleville 40 springs to maintain the zero bias location of insert 52. As before, the control unit 46 heats the coils 44, causing unlock component 39 to expand, but in this instance this releases the insert 52 and the nut 34 from the cap 30, but the piston 18, already in its zero bias position, does not move. As the unlock component enlarges, it pushes the bolt 32 to the right until the bolt engages stop point 36a and then the tubular insert 52 is forced to the left against the belleville washers 50, disengaging it from the cap 30. Bolt 46 is provided, as before, to manually unlock the payload, but is screwed into insert 52 (only for this unbiased configuration), releasing insert 52 and bolt 32.

One skilled in the art may make modifications, in whole or in part, to a described embodiment of the invention and its various functions and components without departing from the true scope and spirit of the invention.

What is claimed is:

1. An isolator having a piston, in a housing, comprising:
   first means coupled to the piston for resiliently forcing the piston in a first direction;
   second means for resiliently forcing the piston in a second direction opposite the first direction;
   third means for being electrically heated to expand to force first means and said second means in opposite directions to free the piston from the first means; and
   a stop that limits the movement of the first means in said second direction when said third means expands and provides a surface to apply a force from said third means to move the second means away from the piston in said first direction to free the piston from the second means.

2. The isolator described in claim 1, wherein the third means comprises a shape memory alloy.

3. The isolator of claim 2, wherein the first means comprises a first bolt that is coupled to the piston and one or more belleville washers disposed between the first bolt and a housing containing the piston.

4. The isolator described in claim 3, further comprising a second bolt can be rotated to free the piston from the first and second means.

5. The isolator described in claim 1, comprising a bolt that can be rotated to free the piston from the first and second means.

6. The isolator described in claim 3, wherein said second means comprises a tubular insert disposed around at least a portion of the first bolt to selectively engage the piston and one or more belleville washers disposed between one end of the insert and one end of the housing.

7. The isolator described in claim 6, further comprising a second bolt that can rotated to free the piston from the first and second means.

8. The isolator described in claim 7, wherein in the second bolt is rotated to disengage the first bolt and the piston and with additional rotations disengage the tubular insert and the piston.

9. An isolator strut, comprising:
a housing assembly;
a piston assembly moveably mounted within the housing assembly;
a lock assembly mounted within the housing assembly and coupled to the piston assembly, the lock assembly moveable between at least a locked position, in which the piston assembly is substantially inhibited from movement, and an unlocked position, in which the piston assembly is substantially free to move; and
an actuator assembly mounted within the housing assembly and coupled to the lock assembly, the actuator assembly adapted to receive an electrical current and operable, in response thereto, to theramlly expand and move the lock assembly from the locked position to the unlocked position to the unlocked position.

10. The isolator of claim 9, wherein the lock assembly comprises:
a bolt having at least a first end and a second end, the bolt first end coupled to the piston assembly; and
a spring element disposed between the housing and the bolt second end, the spring configured to bias the bolt toward the locked position.

11. The isolator of claim 9, wherein the actuator assembly comprises:
a shape memory metal alloy tube coupled to the lock assembly; and
a heater disposed proximate the shape memory metal alloy tube and coupled to receive the electrical current and operable, in response thereto, to heat at least a section of the shape memory metal alloy tube.

12. The isolator of claim 9, wherein the lock assembly comprises:
a first resilient assembly configured to bias the piston assembly in a first direction; and
a second resilient assembly configured to bias the piston assembly in a second direction;
wherein the actuator assembly, in response to the received electrical current, thermally expands and moves the first resilient assembly in the second direction and the second resilient assembly in the first direction to thereby move the lock assembly to its unlocked position.

13. The isolator of claim 12, wherein the first resilient assembly comprises:
a tubular insert having at least a first end and a second end, the insert first end positioned proximate the piston assembly, to thereby selectively engage the piston assembly; and
a spring element disposed between the housing assembly and the insert second end, the spring element configured to bias the insert toward the first direction to thereby engage the piston assembly.

14. The isolator of claim 12, wherein the second resilient assembly comprises:
a bolt having at least a first end and a second end, the bolt first end coupled to the piston assembly; and
a spring element disposed between the housing assembly and the bolt second end, the spring configured to bias the bolt toward the second direction.

15. The isolator of claim 12, wherein the actuator assembly comprises:
a shape memory metal alloy tube coupled to the first and second resilient assemblies; and
a heater disposed proximate the shape memory metal alloy lube and coupled to receive the electrical current and operable, in response thereto, to heat at least a section of the shape memory metal alloy tube.

\* \* \* \* \*